(12) United States Patent
Visage et al.

(10) Patent No.: US 8,485,491 B2
(45) Date of Patent: Jul. 16, 2013

(54) MOVEMENT LIMITING ANTI-VIBRATION MOUNT

(75) Inventors: Hervé Visage, Chateaudun (FR);
Christophe Jules, Chateaudun (FR);
Pascal Richard, Cloyes sur le Loir (FR)

(73) Assignee: Hutchinson, Paris (FR)

( * ) Notice: Subject to any disclaimer, the term of this patent is extended or adjusted under 35 U.S.C. 154(b) by 310 days.

(21) Appl. No.: 12/816,933

(22) Filed: Jun. 16, 2010

(65) Prior Publication Data
US 2010/0320359 A1    Dec. 23, 2010

(30) Foreign Application Priority Data
Jun. 17, 2009    (FR) ...................................... 09 54086

(51) Int. Cl.
*F16M 7/00*    (2006.01)
*F16M 11/00*    (2006.01)

(52) U.S. Cl.
USPC ........... 248/638; 248/562; 248/573; 248/633; 267/140.11; 267/141.7

(58) Field of Classification Search
USPC ................. 248/638, 658, 636, 637, 562, 566, 248/573, 632–634; 267/140.13, 140.4, 141.5, 267/141.7, 140.11, 140.3, 140.12, 141.3
See application file for complete search history.

(56) References Cited

U.S. PATENT DOCUMENTS

| | | | |
|---|---|---|---|
| 5,295,671 A * | 3/1994 | Nakagaki et al. | 248/638 |
| 6,695,295 B2 * | 2/2004 | Williams | 267/140.13 |
| 6,752,389 B2 * | 6/2004 | Halladay et al. | 267/140.12 |
| 6,820,908 B1 * | 11/2004 | Tousi et al. | 267/141.7 |
| 7,316,389 B2 * | 1/2008 | Rawson | 267/141.7 |
| 7,584,944 B2 * | 9/2009 | Goudie | 267/140.12 |
| 2010/0320359 A1 * | 12/2010 | Visage et al. | 248/638 |

FOREIGN PATENT DOCUMENTS

| | | |
|---|---|---|
| EP | 0 256 762 B1 | 2/1988 |
| EP | 1 026 420 | 8/2000 |

OTHER PUBLICATIONS

English abstract for EP-1 026 420.

* cited by examiner

*Primary Examiner* — Tan Le
(74) *Attorney, Agent, or Firm* — Miller, Matthias & Hull LLP (57) ABSTRACT

Anti-vibration mount comprising first and second mounting members connected to each other by an elastomer body. The first mounting member comprises a head integral with the elastomer body and a connector rigidly fixed to the head by a connection permitting a degree of relative positioning tolerance between the head and the connector in a first direction. The head comprises a deformable stop that is interposed between the second mounting member and the connector, the deformable stop being capable of not obstructing the relative positioning tolerance between the head and the connector, and of abutting against the second mounting member by pressing against the connector in the first direction.

12 Claims, 5 Drawing Sheets

MOVEMENT LIMITING ANTI-VIBRATION MOUNT

CROSS-REFERENCE TO RELATED APPLICATIONS

This application is a Patent Application filing under 35 USC §119 which claims priority under the Paris Convention to French Patent Application No. 09 54086, filed on Jun. 17, 2010.

FIELD OF THE DISCLOSURE

This invention relates to movement limiting anti-vibration mounts intended for example to support the gearbox of a motor vehicle.

More particularly, the invention relates to an anti-vibration mount intended to connect first and second vehicle components (for example part of the power train and the body of a vehicle) for the purposes of shock absorption and support, comprising:
- a first mounting member comprising a rigid head and a rigid connector intended to be fixed to the first vehicle component, the connector being rigidly fixed to said head by a connection permitting a degree of relative positioning tolerance between said head and said connector at least in a first direction (this is a positioning tolerance before installation of the connection between the two parts: once the connection is installed, the two parts are normally no longer mobile relative to each other),
- a second rigid mounting member intended to be fixed to the second vehicle component,
- an elastomer body connecting the head of the first mounting member to the second mounting member and capable of supporting a static load (for example part of the weight of the power train of the vehicle) applied to the first mounting member in a second direction approximately perpendicular to the first direction and of allowing relative movements between the first and second mounting members at least in the first and second directions, said second mounting member being capable of cooperating by abutment with the first mounting member in the first direction.

BACKGROUND OF THE DISCLOSURE

Figure 1:
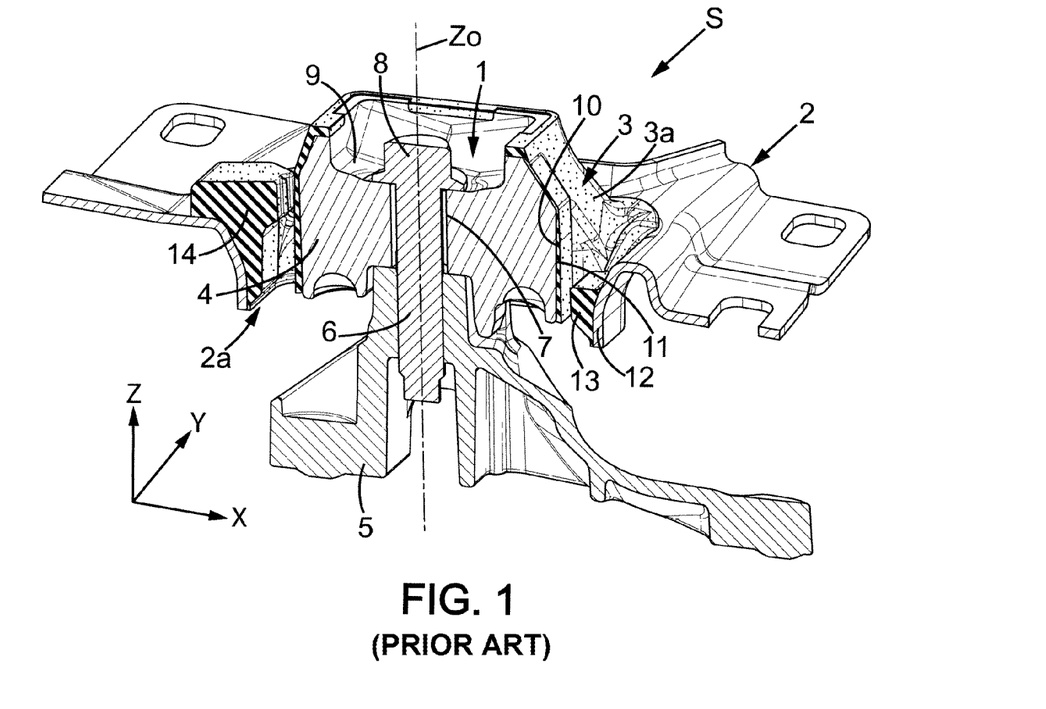
FIG. 1 is a perspective vertical cross-sectional view of an anti-vibration mount of the prior art.

In the known anti-vibration mounts of this type, an example of which is shown in FIG. 1, the second mounting member is capable of abutting against the head of the first mounting member to limit the relative movements between the first and second mounting members in the second direction.

This abutment cooperation can generate significant shear stresses along the second axis, which are applied to the fixing between the head and the connector of the first mounting member (for example a screw connection), with the risk of damaging it.

In addition, these shear stresses can at least partly separate the head and the connector of the first mounting member, particularly by causing sliding between the head and the connector in the second direction, due to the positioning tolerance between the two parts. For example, when the two parts are fixed together with a screw extending in the first direction and having a degree of play along the second axis relative to the head or the connector, the connector can thus slide relative to the head, as the two parts are only immobilised along the second axis by the tightening of the screw.

A particular object of this invention is to overcome these drawbacks.

SUMMARY OF THE DISCLOSURE

To this end, according to the invention, an anti-vibration mount of the type in question is characterised in that the head of the first mounting member comprises a deformable stop that is interposed between the second mounting member and the connector in the first direction, the deformable stop being capable of not obstructing the relative positioning tolerance between the head of the first mounting member and the connector, and said deformable stop being capable of abutting against the second mounting member by pressing against the connector in order to limit the relative movements between the first and second mounting members in said first direction.

As a result of these provisions, the stresses generated by the limitation of movement in the first direction are transmitted directly between the connector and the second mounting member, without generating any shear stress between the head of the first mounting member and the connector, in such a way that the stop does not generate any shear stress in the fixing between the head and the connector of the first mounting member. As a result, the connection between the head of the first mounting member and the connector can be dimensioned for less significant stresses than in the prior art, resulting in cost and weight savings.

In addition, because the deformable stop is integral with the head of the first mounting member, it does not hinder any fixing of the connector to the first vehicle component (for example the power train of the vehicle) before said connector is fixed to the head of the first mounting member.

Finally, due to the deformable nature of the stop, it can simultaneously press against the connector when it abuts against the second mounting member and remain compatible with the positioning tolerance between the head of the first mounting member and the connector, which positioning tolerance allows for example for the head of the first mounting member and the connector to be assembled without difficulty during the mounting of the power train on a vehicle body, when on the one hand the connector has already been fixed to the power train and on the other hand the second mounting member has been fixed to the body.

In various embodiments of the anti-vibration mount according to the invention, one or more of the following provisions may be used:
- the deformable stop is made at least partly from a synthetic material;
- the deformable stop is overmoulded on the head of the first mounting member;
- the deformable stop is made at least partly from aluminium;
- the deformable stop comprises a head portion integral with the head of the first mounting member and a descending portion that extends in the second direction towards the connector from the head portion to a stop portion placed between the connector and the second mounting member in the first direction;
- the descending portion of the deformable stop is flexible in the first direction and said stop portion is less deformable than the descending portion in the first direction;
- the descending portion of the deformable stop comprises at least one cavity allowing said descending portion to be flexible in the first direction;

play is arranged between the deformable stop and the connector in the first direction;

the connector is in permanent contact with the deformable stop and exerts deformation on said deformable stop;

the connection between the head of the first mounting member and the connector comprises at least one screw extending in the second direction, said screw passing with radial play through at least one part chosen from the head of the first mounting member and the connector, the connector and the head of the first mounting member being rigidly secured to each other by tightening of the screw;

the second mounting member is annular and has an opening through which the first mounting member passes in the second direction, said second mounting member having at least one flange that at least partly delimits said opening and against which said deformable stop abuts;

said flange comprises at least one elastomer thrust pad against which said deformable stop abuts.

BRIEF DESCRIPTION OF THE DRAWINGS

Further characteristics and advantages of the invention will become apparent on reading the following description of two of its embodiments, given as non-limitative examples, in relation to the attached drawings.

On the drawings.

DETAILED DESCRIPTION OF THE DISCLOSURE

In the various figures, the same reference denotes identical or similar components.

FIG. 1 shows an anti-vibration mount S of the prior art, comprising a rigid first mounting member 1, generally metal, a rigid second mounting member 2, also generally metal (made for example from sheet steel), and an elastomer body 3 connecting the two mounting members 1, 2.

The first mounting member 1 is intended to be fixed to a first vehicle component, for example part of the power train of the vehicle (not shown) and more particularly the gearbox of the vehicle.

The second mounting member 2 is intended to be fixed to a second vehicle component, for example the body of the vehicle (not shown).

The elastomer body 3, for its part, is capable of supporting the static load represented by the weight of part of the power train of the vehicle, which is suspended on the first mounting member 1, and of allowing displacements between the two mounting members 1, 2 parallel to a first horizontal direction X, parallel to a second vertical direction Z and optionally parallel to a third direction Y, which is horizontal and perpendicular to the directions X and Z. To this end, the elastomer body is overmoulded and bonded to the two mounting members 1, 2 and comprises for example two arms 3a together forming an inverted V, which support the first mounting member.

The first mounting member 1 can be made up of two parts assembled to each other, in this case a rigid head 4, generally metal (made for example from aluminium or cast iron), onto which the elastomer body 3 is overmoulded, and a connector 5 (made for example from aluminium or cast iron) on which is suspended the gearbox of the power train of the vehicle. The connector 5 is fixed to the head 4 by a screw 6 that is screwed into the connector 5. This screw extends along a vertical central axis Z0 and passes, with a degree of radial play, through a hole 7 made in the head 4.

The head 8 of the screw 6 is tightened pressing against the upper surface 9 of the head 4, completely immobilising the connector 5 relative to the head 4 after tightening of the screw.

The anti-vibration mount S is generally initially separated into two parts, namely:

on the one hand, the second mounting member 2, the elastomer body 3 and the head 4, which are initially fixed to the body of the vehicle, and on the other hand, the connector 5, which is initially fixed to the gearbox of the power train of the vehicle.

During assembly of the power train of the vehicle in the body, the connector 5 is positioned under the head 4 and the screw 6 is screwed into the connector 5. During this positioning, the radial play between the screw 6 and the through-hole 7 in the head 4 allows for a degree of relative positioning tolerance between the connector 5 and the head 4 in directions X, Y.

Once the power train of the vehicle has been mounted on the body, it is partly supported by the anti-vibration mount S, and the relative displacements between the two mounting members 1, 2, which can be due either to the running of the engine or to the movement of the vehicle, are limited particularly in the first direction X by abutment of the external lateral surface 10 of the head 4 (optionally coated with a thin layer of elastomer 11 moulded in one piece with the elastomer body 3) against thrust pads 13, 14 integral with the second mounting member 2.

In the example in FIG. 1, the second mounting member 2 is a piece of cut and shaped sheet metal that has a central opening 2a through which the first mounting member 1 passes. This central opening 2a is formed in particular by a flange 12 of the second mounting member 2, which extends substantially downwards in a well-shape and on which the thrust pads 13, 14 can be overmoulded, for example, which thrust pads can in particular be elastomer blocks moulded in one piece with the elastomer body 3.

When the head 4 of the first mounting member 1 abuts against the thrust pads 13, 14 and in particular against the thrust pad 13, the head 4 can tend to slide relative to the connector 5 despite the tightening of the screw 6, given the radial play that exists between the hole 7 and the screw 6.

This can result in the gradual separation of the head 4 of the first mounting member and the connector 5, which is avoided by this invention.

A first embodiment of the invention is shown in FIGS. 2 to 5, which show an anti-vibration mount S having a number of shared characteristics with the anti-vibration mount S of the prior art shown in FIG. 1.

Figure 2:
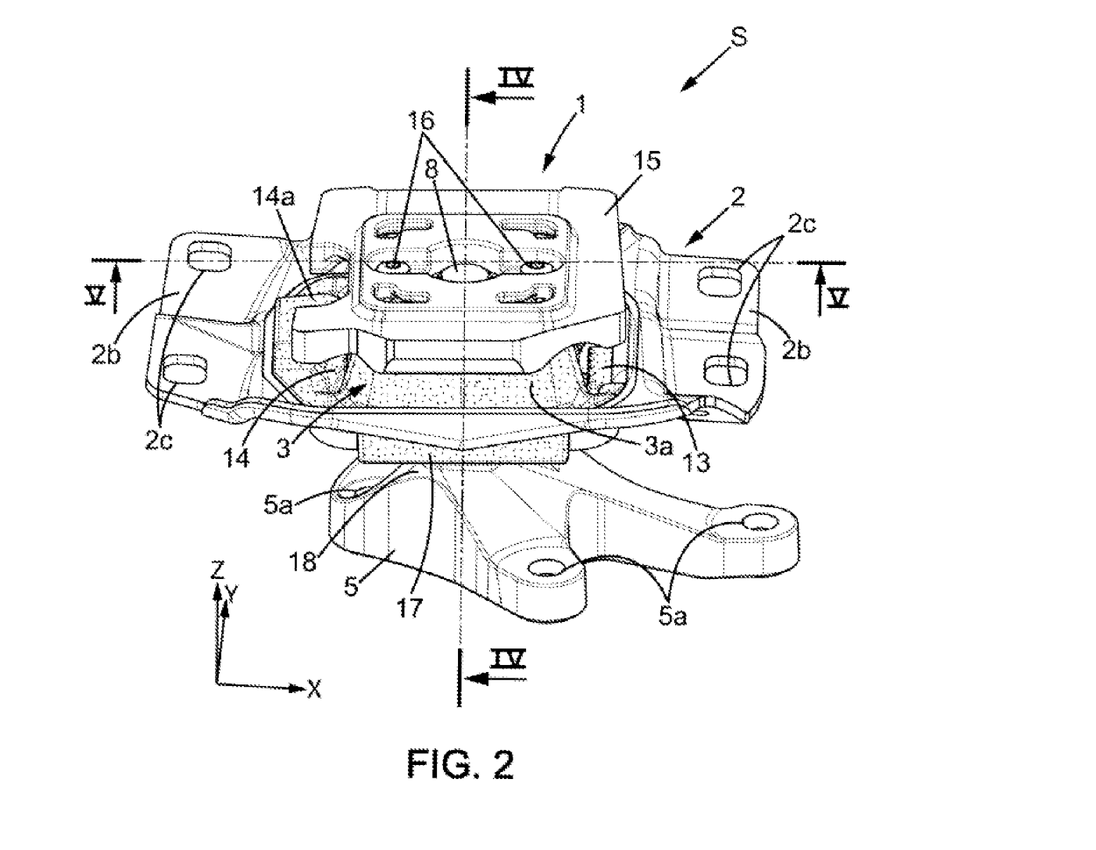
FIGS. 2 and 3 are respectively three-quarter top and bottom perspective views of an anti-vibration mount in a first embodiment of the invention.
Figure 3:
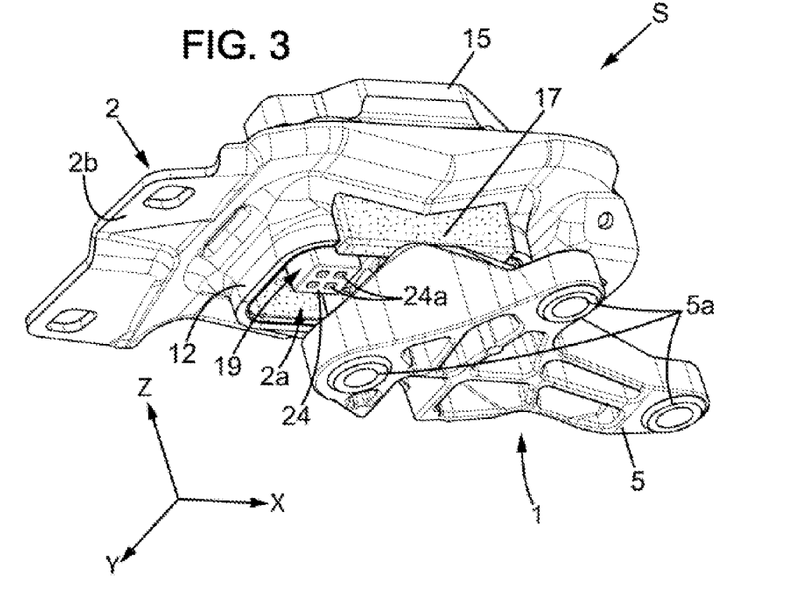
Figure 4:
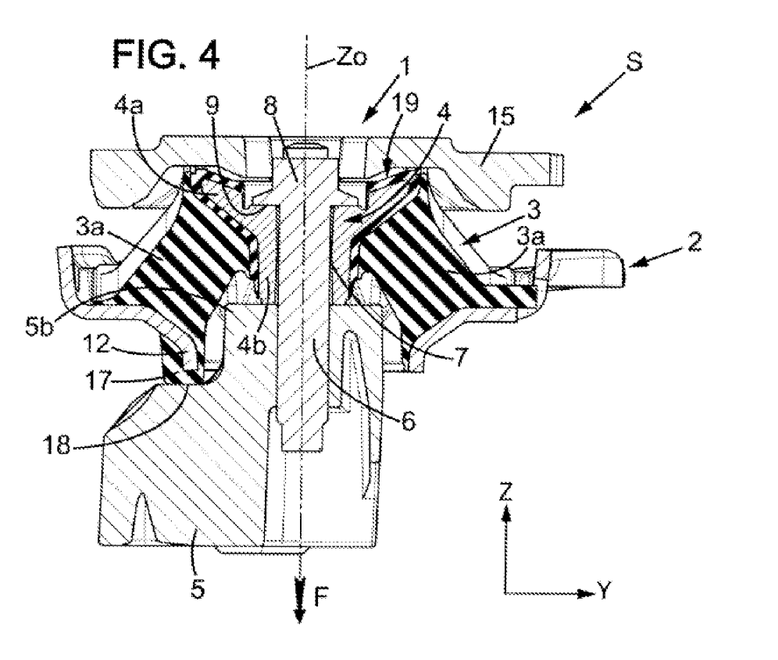
FIG. 4 is a vertical cross-sectional view of the anti-vibration mount in FIGS. 2 and 3, along the line IV-IV in FIG. 2.

Thus, the anti-vibration mount S in FIGS. 2 to 4, like the mount in FIG. 1, comprises a rigid first mounting member 1, generally metal, a rigid second mounting member 2, also generally metal (made for example from sheet steel), and an elastomer body 3 connecting the two mounting members 1, 2.

The first mounting member 1 is, like in the mount in FIG. 1, intended to be fixed to a first vehicle component, for example part of the power train of the vehicle (not shown) and more particularly the gearbox of the vehicle. The second mounting member 2 is intended to be fixed to a second vehicle component, for example the body of the vehicle (not shown).

The elastomer body 3, like in the mount in FIG. 1, is capable of:
- supporting a static load F (FIG. 4) represented by the weight of part of the power train of the vehicle, which is suspended on the first mounting member 1,
- and allowing displacements between the two mounting members 1, 2 parallel to a first horizontal direction X, parallel to a second vertical direction Z and optionally parallel to a third direction Y, which is horizontal and perpendicular to the directions X, Z.

To this end, the elastomer body is overmoulded and bonded to the two mounting members 1, 2 and comprises for example two arms 3a together forming an inverted V (FIG. 4), which support the first mounting member, as in FIG. 1.

The first mounting member 1 can be made up of two parts assembled to each other, in this case:
- a rigid head 4, generally metal (made for example from aluminium or cast iron), which can comprise for example:
  - a widened upper part 4a integral with the elastomer body 3,
  - a central part 4b narrower than the upper part 4a and extending downwards from the upper part 4a, grooves 4c parallel to the third direction Y optionally being made in the lower face of the widened upper part 4a on either side of said central part 4b (see FIG. 5),
- and a connector 5 (made for example from aluminium or steel) that is not directly connected to the elastomer body 3 and on which is suspended the gearbox of the power train of the vehicle, for example by screws (not shown) passing through holes 5a in the support component.

As in the mount S in FIG. 1, the connector 5 is fixed to the head 4 by a screw 6 that is screwed into an upper end part 5b of the connector 5. This screw extends along a vertical central axis Z0 and passes, with a degree of radial play (for example of the order to 0.5 to 1 mm), through a hole 7 made in the head 4, for example passing through the central part 4b.

The head 8 of the screw 6 is tightened pressing against the upper surface 9 of the head 4, completely immobilising the connector 5 relative to the head 4 after tightening of the screw.

As in FIG. 1, the second mounting member 2 is a piece of cut and shaped sheet metal that has a central opening 2a through which the first mounting member 1 passes and for example two substantially horizontal facing wings 2b that are capable of resting on part of the vehicle body and being fixed to it by screws (not shown) passing through holes 2c made in such wings.

The central opening 2a is formed in particular by an annular flange 12 of the second mounting member 2, which extends substantially downwards forming a well and onto which the elastomer body is overmoulded and bonded. Thrust pads 13, 14 can for example be overmoulded onto this flange 12, oriented inwards (that is, towards the first mounting member 1), which thrust pads can in particular be elastomer blocks moulded in one piece with the elastomer body 3 (see FIG. 5).

As in FIG. 1, the anti-vibration mount S is generally initially separated into two parts, namely:
- on the one hand, the second mounting member 2, the elastomer body 3 and the head 4, which are initially fixed to the body of the vehicle,
- and on the other hand, the connector 5, which is initially fixed to the gearbox of the power train of the vehicle.

During assembly of the power train of the vehicle in the body, the connector 5 is positioned under the head 4 and the screw 6 is screwed into the connector 5. During this positioning, the radial play between the screw 6 and the through-hole 7 in the head allows for a degree of relative positioning tolerance between the connector 5 and the head 4 in directions X, Y.

Once the power train of the vehicle has been mounted on the body, it is supported in particular by the anti-vibration mount S, and during the operation of the vehicle, the two mounting members 1, 2 undergo relative displacements in the three directions X, Y, Z, particularly in directions X and Z.

Figure 5:
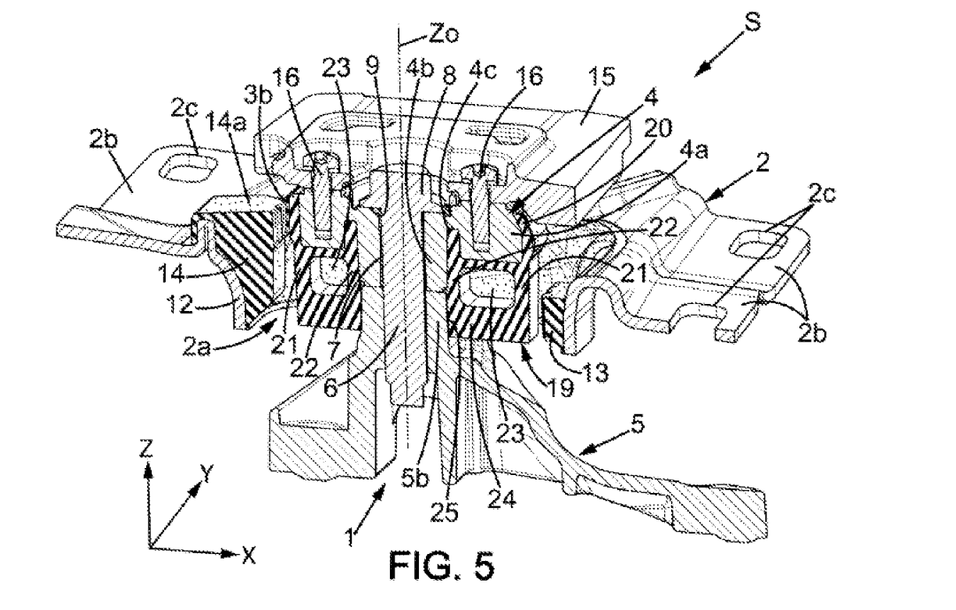
FIG. 5 is a vertical cross-sectional perspective view of the anti-vibration mount in FIGS. 2 and 3, along the line V-V in FIG. 3.

The displacements of the first mounting member 1 relative to the second mounting member 2 in the second direction Z can be limited for example:
- downwards, by a rigid stop plate 15, made for example from metal, which is fixed by screws 16 or others, on the upper face of the head 4, on either side of the aforementioned screw 6; this stop plate 15 can for example cooperate by abutment with the second mounting member 2, optionally with the interposition of elastomer thrust pads integral with the second mounting member 2 (the stop plate 15 can thus cooperate in particular with the upper face 14a of the aforementioned stop 14, clearly visible in FIG. 5),
- and upwards, by the abutment of the connector 5 against the second mounting member, and particularly against an elastomer stop 17 which can for example be moulded in one piece with the elastomer body 3 and which covers the lower edge of the flange 12 opposite a substantially horizontal thrust face 18 belonging to the connector 5.

The displacements of the first mounting member 1 relative to the second mounting member 2 in the third direction Y can be limited for example by abutment of the end part 5b of the connector against the flange 12 of the second mounting member, with interposition of the lower parts of the arms 3a of the elastomer body (see FIG. 4).

Figure 6:
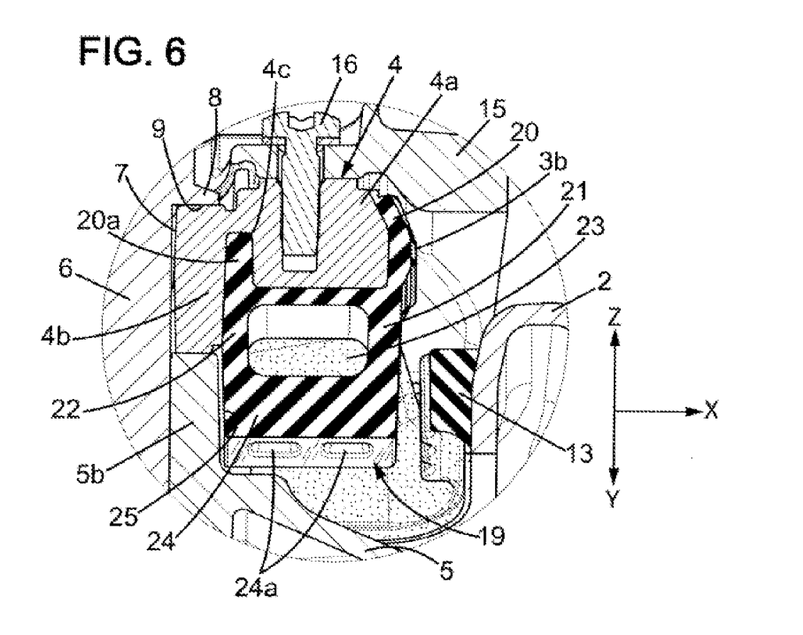
FIG. 6 is a detailed view showing part of the anti-vibration mount in FIG. 5, the anti-vibration mount being seen slightly from below projected in a plane containing the X-axis but inclined relative to the Z-axis.

Furthermore, as can be seen in FIGS. 5 and 6, the relative displacements between the two mounting members 1, 2 are limited, in the first direction X, by a deformable stop 19 that forms part of the head 4 and which cooperates by abutment against the flange 12 of the second mounting member, and more particularly against the aforementioned thrust pads 13, 14 that are integral with this flange 12.

As can be seen in FIGS. 4 and 5, the deformable stop 19 can for example have an annular shape and surround the head 4. More particularly, the deformable stop 19 can be made from a thermoplastic material (for example polyamide 6/6 reinforced or not with inserts or fibres, and can comprise a head portion 20 that is overmoulded onto the widened upper part 4a of the head 4, covering such widened upper part 4a radially outwards and optionally partly upwards. This head portion 20 of the deformable stop 19 can optionally also comprise a part 20a entering the groove 4c that is formed in the lower face of the widened head 4a.

As can be seen in FIGS. 5 and 6, from the head portion 20, each of the two diametrically opposed parts of the deformable stop 19, which are aligned in the first direction X, extends downwards, i.e. towards the connector 5, by a descending flexible portion formed by two flexible walls 21, 22 each extending in a plane (Y, Z). One 21 of these walls is arranged near the central part 4b of the head 4 and the other 22 of these walls is arranged outwards, i.e. near the corresponding thrust pad 13, 14.

These flexible walls 21, 22 delimit between them a cavity 23 that passes through the deformable stop 19 in the third direction Y, thus facilitating the deformations of the descending part 21-23.

Said flexible walls 21, 22 extend up to a relatively solid stop portion 24, which is less deformable than the walls 21, 22 in the first direction X. This stop portion 24 can however optionally be pierced by cavities 24a formed for example in the lower face of the stop portion 24 in such a way as to control the stiffness of this stop portion 24 in the first direction X (see FIGS. 3 and 6).

Each stop portion 24 has an inner face 25 that is arranged opposite the end part 5b of the connector and is separated from such end part 5b by slight play, for example of the order of 0.2 to 1 mm. Thus, the presence of the stop 19 does not limit the positioning tolerances between the head 4 and the connector 5 during assembly of these two parts.

Each stop portion 24 of the deformable stop 19 is directly interposed between the corresponding thrust pad 13, 14 and the end part 5b of the connector 5.

Figure 7:
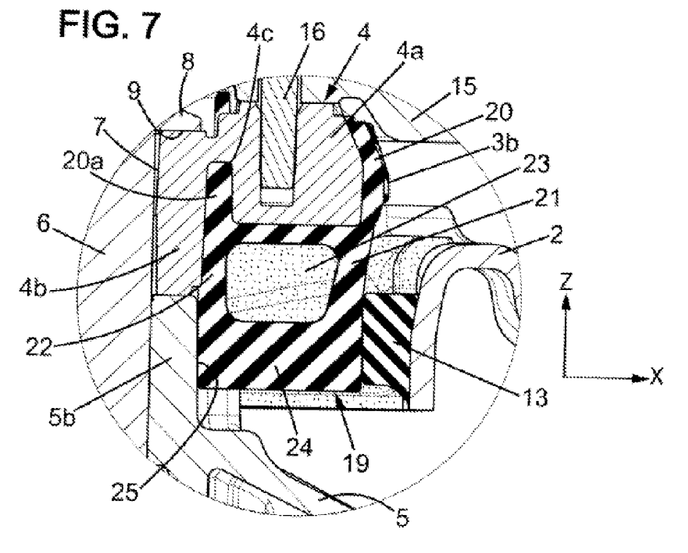
FIG. 7 is a similar view to FIG. 6, projected in the vertical cross-sectional plane (X, Z), the anti-vibration mount being seen in a stop position.

In addition, the thrust pad 13 does not cooperate at all by abutment with the rigid head 4 of the first mounting member, unlike in the prior art, but solely with the corresponding thrust portion 24 in the direction X. Consequently, when the first mounting member 1 is moved towards the thrust pad 13 (FIG. 7), the corresponding thrust portion 24 abuts against said thrust pad 13, which deforms the corresponding flexible walls 21, 22 of the deformable stop 19, so that the lower face 25 of said stop portion 24 presses against the end part 5b of the connector 5. Consequently, the limiting of the movement of the first mounting member 1 in the first direction X, towards the thrust pad 13, is obtained without generating any shear stress between the head 4 and the connector 5, with the advantages already explained above.

Moreover, the operation of the thrust pad 14 is similar to the operation of the thrust pad 13, apart from that in the example shown, the thrust pad 14 cooperates by abutment both with the corresponding stop portion 24 and with the rigid head 4 of the first mounting member, in a similar way to the prior art shown in FIG. 1. The shear stresses that are thus generated between the head 4 and the connector 5 remain limited however in this particular example, in that the first mounting member 1 of the anti-vibration mount is intended to undergo less significant horizontal dynamic stresses in the direction of the thrust pad 13 than in the direction of the thrust pad 14. Consequently, the fact that the thrust pad 14 presses simultaneously against the head 4 and the stop portion 24 has no harmful consequences in this scenario.

Of course, the anti-vibration mount according to the invention could also be designed with a thrust pad 14 that only presses against the corresponding thrust portion 24, like the thrust pad 13.

In any event, the deformations undergone by the deformable descending portions 21-23 of the stop 19 can be elastically and/or plastically deformable on contact against the thrust pads 13, 14.

Moreover, it will be noted that in all of the embodiments of the invention, the deformable stop 19 could be made from a material other than thermoplastic material, for example aluminium (optionally with a shape similar to that shown in the drawings). In addition, the deformable stop 19 could optionally be formed in one piece with the head 4. Finally, the deformable stop 19 could optionally be a composite part made up of several materials, for example with a head portion 20 and flexible walls 21, 22 made from rubber and stop portions 24 made from a thermoplastic material or aluminium, or another material.

Figure 8:
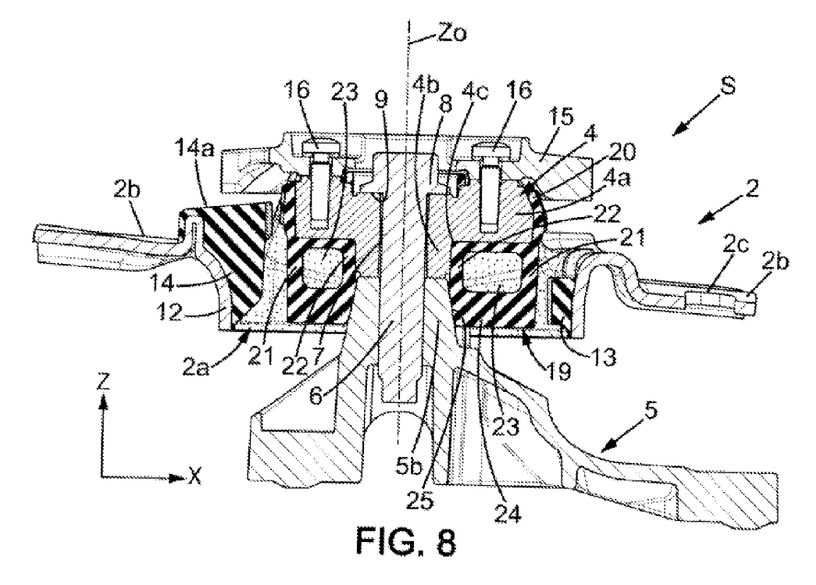
FIG. 8 is a vertical cross-sectional view of an anti-vibration mount according to a second embodiment of the invention, the cross-section being taken in the same planigraphic plane as FIG. 5.

The second embodiment of the invention, which is shown in FIG. 8, is very similar to the first embodiment and will not therefore be described again in detail here.

This second embodiment of the invention essentially differs from the first embodiment by the fact that the end part 5b of the connector 5, which can have for example a substantially tapered shape flared towards the bottom, is engaged on contact with the inner surface 25 of the stop portions 24 of the deformable stop 19, deforming such stop portions even in the absence of contact between the thrust pads 13, 14 and the corresponding stop portion 24. In this case, the mobile stop 19 allows, as in the embodiment described above, a degree of relative positioning tolerance between the head 4 and the connector 5 during their assembly, parallel to the first direction X, due to the resilience of the material forming the deformable stop 19.

The invention claimed is:

1. An anti-vibration mount intended to connect first and second vehicle components for the purposes of shock absorption and support, comprising:
    a first mounting member comprising:
        a head defining a first portion of a channel; and
        a connector intended to be fixed to the first vehicle component, the connector fixed to said head by a connection configured to permit a degree of relative positioning tolerance between said head and said connector at least in a first direction, said connector including:
            an upper end part defining a second portion of the channel, the upper end part extending longitudinally in a second direction substantially perpendicular to the first direction; and
            a thrust face substantially perpendicular to the upper end part, the thrust face intersecting the upper end part,
    a second mounting member configured to be fixed to the second vehicle component,
    an elastomer body connecting the head of the first mounting member to the second mounting member and configured to support a static load applied to the first mounting member in said second direction and configured to allow relative movements between the first and second mounting members at least in the first and second directions,
said second mounting member configured to cooperate by abutment with the first mounting member in the first direction,
wherein the head comprises a deformable stop that is interposed between the second mounting member and the connector in the first direction, the stop and the thrust face of the connector defining a gap extending in the second direction, the deformable stop configured to not obstruct the relative positioning tolerance between the head of the first mounting member and the connector, and said deformable stop configured to abut against the second mounting member by pressing against the connector in order to limit the relative movements between the first and second mounting members in said first direction, wherein further the thrust face is disposed outside of the elastomer body.

2. The anti-vibration mount according to claim 1, in which the deformable stop is made at least partly from a synthetic material.

3. The anti-vibration mount according to claim 1, in which the deformable stop is overmoulded on the head of the first mounting member.

4. The anti-vibration mount according to claim 1, in which the deformable stop is made at least partly from aluminium.

5. The anti-vibration mount according to claim 1, in which the deformable stop comprises a head portion integral with the head of the first mounting member and a descending portion that extends in the second direction towards the connector from the head portion to a stop portion interposed between the connector and the second mounting member in the first direction.

6. The anti-vibration mount according to claim 5, in which the descending portion of the deformable stop is flexible in the first direction and said stop portion is less deformable than the descending portion in the first direction.

7. The anti-vibration mount according to claim 6, in which the descending portion of the deformable stop comprises at least one cavity allowing said descending portion to be flexible in the first direction.

8. The anti-vibration mount according to claim 1, in which play is arranged between the deformable stop and the connector in the first direction.

9. The anti-vibration mount according to claim 1, in which the connector is in permanent contact with the deformable stop and exerts deformation on said deformable stop.

10. The anti-vibration mount according to claim 1, in which the connection between the head of the first mounting member and the connector comprises at least one screw extending in the second direction, said screw passing with radial play through at least one part chosen from the head of the first mounting member and the connector, the connector and the head of the first mounting member secured to each other by tightening of the screw.

11. The anti-vibration mount according to claim 1, in which the second mounting member is annular and has an opening through which the first mounting member passes in the second direction, said second mounting member having at least one flange that at least partly delimits said opening and against which said deformable stop abuts.

12. The anti-vibration mount according to claim 1, in which said flange comprises at least one elastomer thrust pad against which said deformable stop abuts.

* * * * *